(12) United States Patent
Sauerwein, Jr.

(10) Patent No.: US 8,083,149 B2
(45) Date of Patent: Dec. 27, 2011

(54) ANNOTATION OF OPTICAL IMAGES ON A MOBILE DEVICE

(75) Inventor: James T. Sauerwein, Jr., Charlotte, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 90 days.

(21) Appl. No.: 12/612,835

(22) Filed: Nov. 5, 2009

(65) Prior Publication Data

US 2011/0101103 A1    May 5, 2011

(51) Int. Cl.
*G06K 7/00* (2006.01)
*G06F 17/00* (2006.01)
*G03B 17/24* (2006.01)

(52) U.S. Cl. .............. 235/472.01; 235/375; 235/462.01; 235/470; 235/472.02; 235/472.03; 396/310; 396/313

(58) Field of Classification Search ..... 235/435–462.49, 235/470, 472.01–472.03; 396/310, 313
See application file for complete search history.

(56) References Cited

U.S. PATENT DOCUMENTS

| | | | |
|---|---|---|---|
| 5,637,871 A | 6/1997 | Piety et al. | |
| 5,845,161 A | 12/1998 | Schrock et al. | |
| 6,019,286 A * | 2/2000 | Li et al. | 235/454 |
| 6,038,406 A | 3/2000 | Xie et al. | |
| 6,900,819 B2 | 5/2005 | Marshall et al. | |
| 7,142,196 B1 | 11/2006 | Connor et al. | |
| 7,453,472 B2 | 11/2008 | Goede et al. | |
| 7,551,187 B2 | 6/2009 | Agrawala et al. | |
| 2002/0023961 A1 | 2/2002 | Itou et al. | |
| 2002/0075282 A1 | 6/2002 | Vetterli et al. | |
| 2003/0038821 A1 | 2/2003 | Kraft | |
| 2003/0089775 A1 * | 5/2003 | Yeakley et al. | 235/454 |
| 2003/0117378 A1 | 6/2003 | Carro | |
| 2005/0174456 A1 | 8/2005 | Rai et al. | |
| 2009/0060490 A1 * | 3/2009 | Kuwahara et al. | 396/429 |

FOREIGN PATENT DOCUMENTS

JP    2005084713 A    3/2005

OTHER PUBLICATIONS

EPO, European Search Report, dated Mar. 11, 2011, total 3 pages.
Rohs, Michael and Roduner, Christof, "Camera Phones with Pen Input as Annotation Devices", Institute for Pervasive Computing, Department of computer Science, Eth Zurich, Switzerland (Rohs@inf.ethz.ch), pp. 1 through 3, Nov. 14, 2005.

(Continued)

*Primary Examiner* — Michael G Lee
*Assistant Examiner* — Laura Gudorf
(74) *Attorney, Agent, or Firm* — Hiscock & Barclay, LLP

(57) ABSTRACT

A method of operating an image reader comprising the steps of: converting light reflected from a target into image data utilizing an image sensor; storing the image data in a display buffer; displaying the image on a display; annotating the displayed image by the operator while the image data is stored in the display buffer, thereby altering the image data in the display buffer; and, transmitting the altered image data from the display buffer; wherein the image sensor, display and display buffer are disposed in a common housing for hand held operation.

18 Claims, 7 Drawing Sheets

OTHER PUBLICATIONS

Wilhelm, Anita, et al., "Photo Annotation on a Camera Phone", School of Information Management and Systems, University of California Berkeley, CHI 2004—Late Breaking Results Paper, Apr. 24-29, Vienna, Austria, ACM 1-58113-703-6/04/0004, {awilhelm, yuri, vanhouse, marc}@sims.berkeley.edu; found at http://portal.acm.org/citation.cfm?id=986075, pp. 1403 through 1406; re-printed from internet on Aug. 18, 2009, pp. 1 through 4.

Microsoft PressPass press release, "Digital Ink, Breakthrough Technology in Tablet PC, Brings the Power of hte Pen to the Desktop", Redmond, Wash., Oct. 29, 2002, found at http://www.microsoft.com/presspass/features/2002/oct02/10-29TabletInking.mspx, printed from internet on Aug. 18, 2009 pp. 1 through 4.

Nikon MicroscopyU, "Annotation Tools", found at http://www.microscopyu.com/articles/digitalimaging/dn100/annotationtools.html, printed from internet on Aug. 18, 2009, pp. 1 through 2.

* cited by examiner

ANNOTATION OF OPTICAL IMAGES ON A MOBILE DEVICE

FIELD OF THE INVENTION

The present invention relates to indicia reading devices, and more particularly to a mobile device adapted for image annotation.

BACKGROUND

Indicia reading devices (also referred to as scanners, image reader, indicia readers, etc.) typically read data represented by printed or displayed information bearing indicia (IBI), (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible or infrared light. Laser indicia reading devices typically utilize transmitted laser light.

One-dimensional (1D) optical bar code readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a remote computer.

Some data collection devices, such as hand-held indicia readers, are capable of capturing images as well as reading barcodes. The reading and decoding of a barcode represents an operation distinct from that involved in capturing an image. The reading and decoding of a bar code involves the imaging and then decoding of a one or two dimensional graphic symbol into the alphanumeric, full ASCII or other data sequence encoded by the symbol. The capturing of an image involves storing an electronic visual copy/representation of the image.

Efforts regarding such systems have led to continuing developments to improve their versatility, practicality and efficiency.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an information bearing indicia (or symbol). The term imaging used herein refers to the taking or creation of an electronic image.

Figure 1:
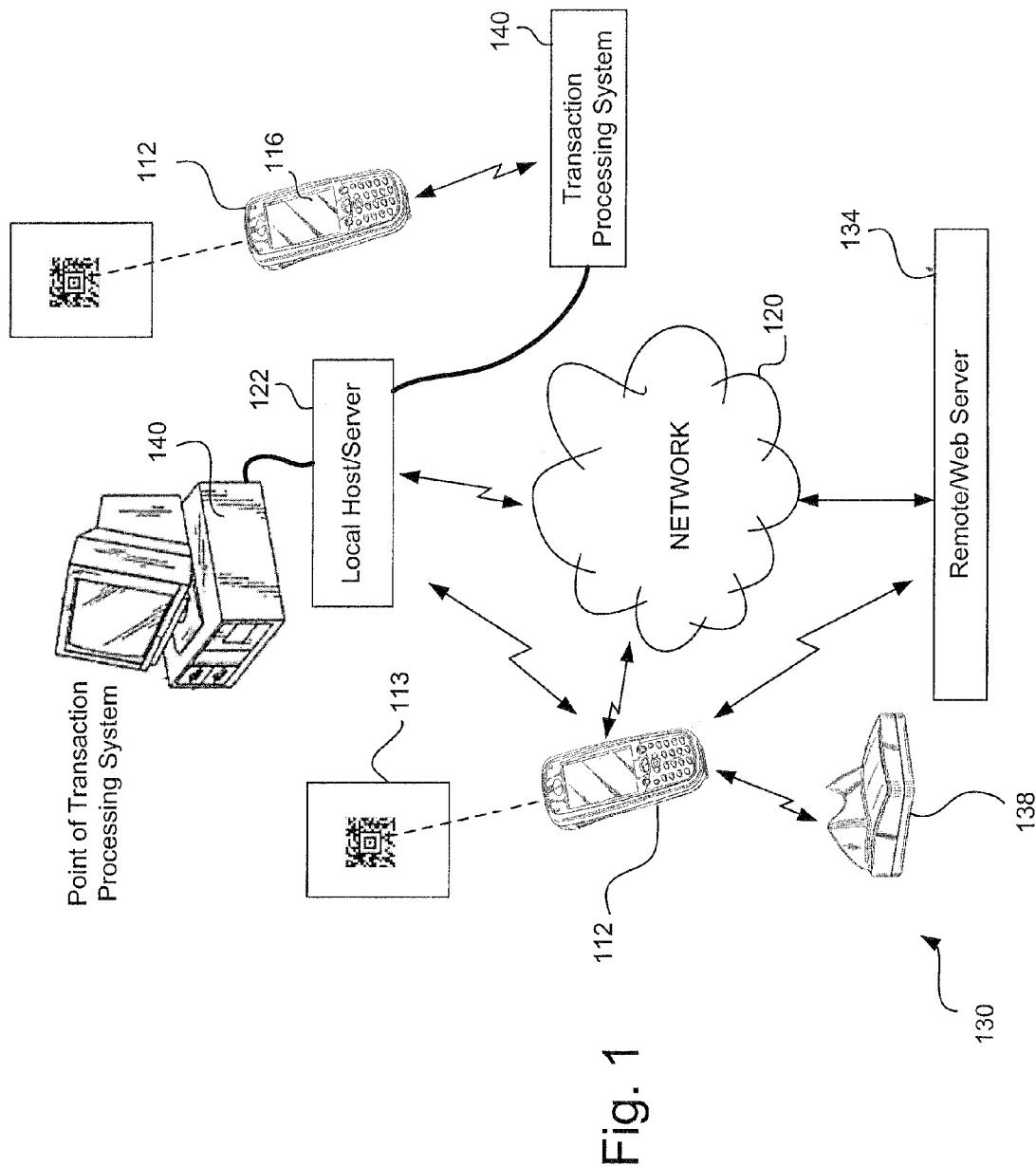
FIG. 1 is a block diagram of an exemplary mobile device system.
Figure 2:
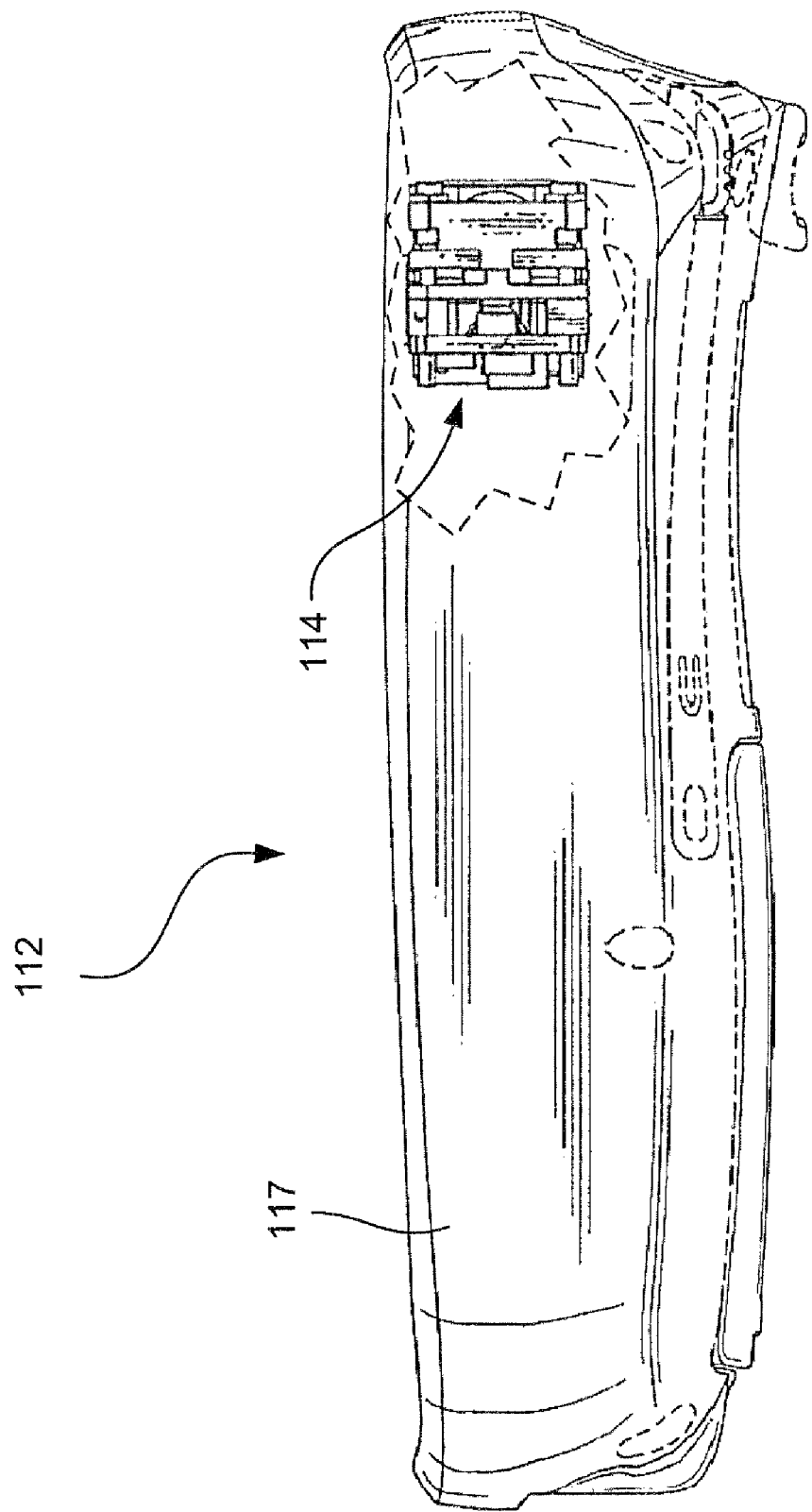
FIG. 2 is a fragmentary partially cutaway side view of an exemplary mobile device.
Figure 3:
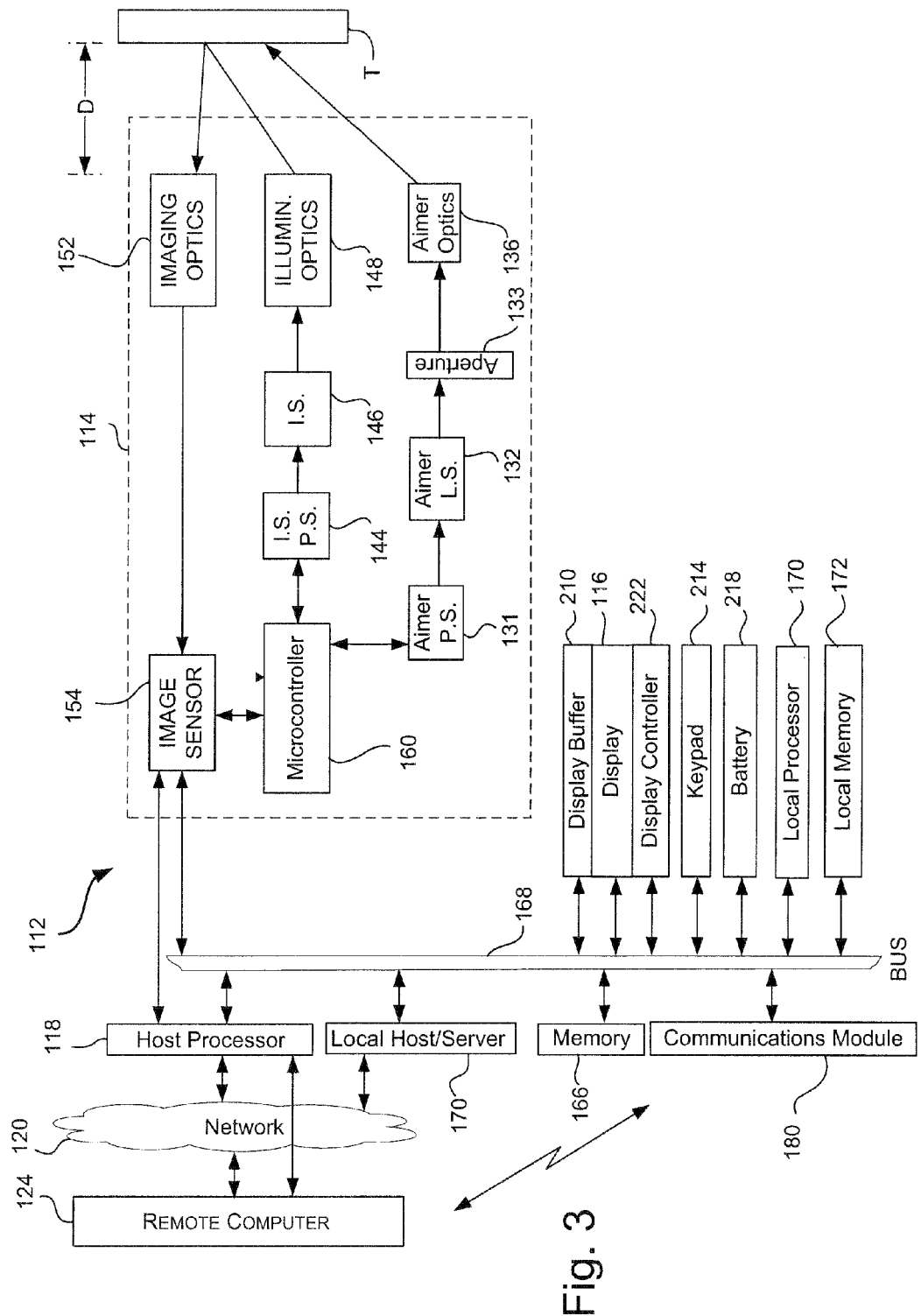
FIG. 3 is a block schematic diagram of an exemplary reader module.
Figure 4:
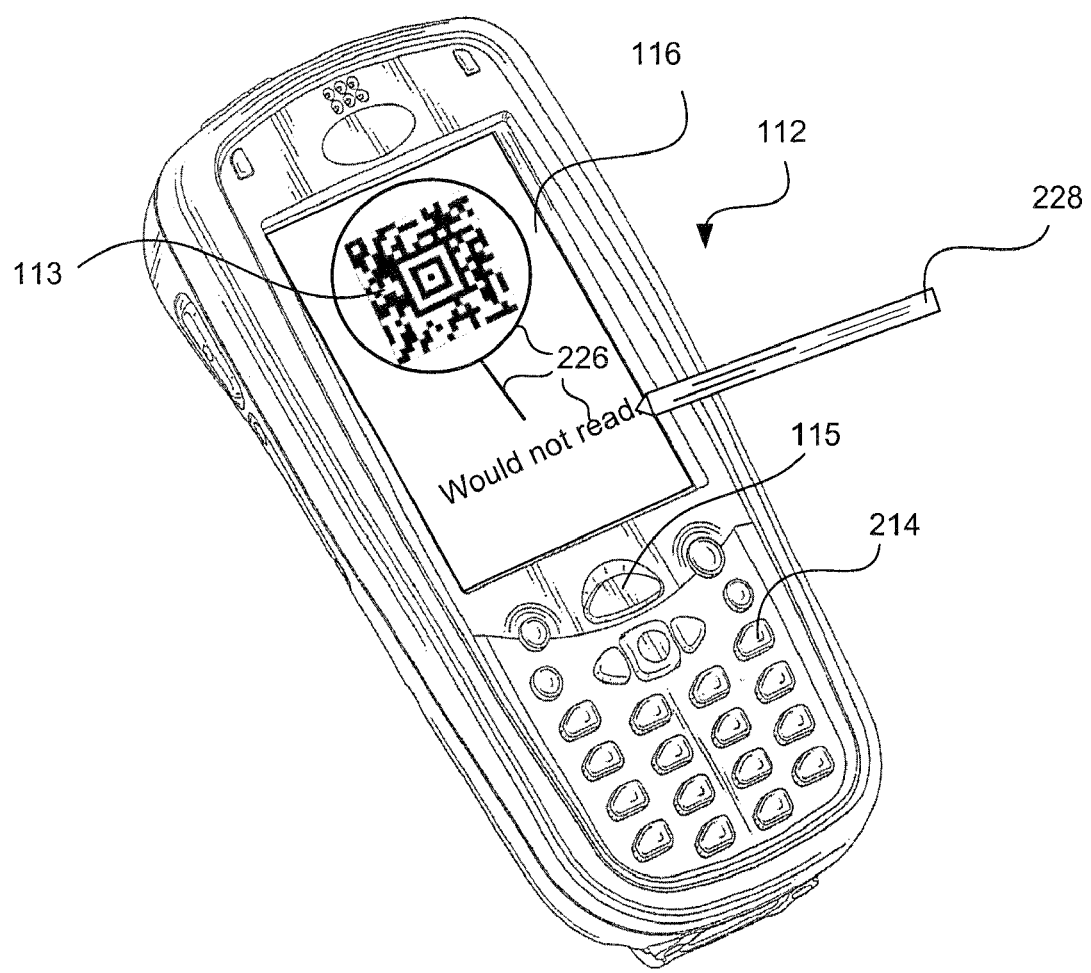
FIG. 4 is a perspective view of an exemplary mobile device.

FIG. 1 illustrates an exemplary scanning system configuration, wherein a plurality of mobile devices 112 are being operated or utilized in an establishment or facility, such as a retail store.

A human operator may aim a hand-held mobile device having an indicia reader at a target containing an information bearing indicia (IBI) 113 or dataform, text, or other element and actuate a trigger on the mobile device. An IBI or dataform may be an originally machine generated symbology that is also machine readable, such as a 1-D barcode, a 2-D barcode, a 1-D stacked barcode, a logo, glyphs, color-codes, and the like.

When using an embodiment of an mobile device, a human operator may intuitively point the indicia reader directly at the data to be collected, regardless of its type, and actuate a trigger.

An exemplary indicia reader 112 may be a mobile device, such as a portable data terminal (PDT), personal digital assistant (PDA), mobile phone, etc. having a display 116. A Portable Data Terminal, or PDT, is typically an electronic device that is used to enter or retrieve data via wireless transmission (WLAN or WWAN) and may also serve as an indicia reader used in a stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet.

An exemplary indicia reader has an image sensor which digitizes a representative image seen in an imaging field of view. The indicia readers may be in communication (wired or wireless) to a local transaction processing system 140, such as a cash register, customer station or employee station. The transaction processing systems 140 may be at a point of transaction (POT) or sale and may be in communication (wired or wireless) with a local server 122. The local server 122 may be in communication with network 120 and or a remote/web server 134.

The Figures illustrate a block diagram of an exemplary mobile device 114 an optical indicia reader 114 may have a number of subsystems for capturing and reading images, some of which may have symbol indicia provided therein or thereon. Reader 114 may have an imaging reader assembly 112 provided within a head portion or housing 117 which may be configured to be hand held by an operator. A trigger 115 may be used to control operation of the reader 114. Indicia reader assembly 114 has imaging receive optics 152 having an optical axis (OA) for receiving light reflected from a target T and directing or projecting the reflected light from the target T to an image sensor 154. The optical axis is a line of symmetry through the imaging optics.

The receive optics 152 has a focal point wherein parallel rays of light coming from infinity converge at the focal point. If the focal point is coincident with the image sensor, the target (at infinity) is "in focus". A target T is said to be in focus if light from target points are converged about as well as desirable at the image sensor. Conversely, it is out of focus if light is not well converged. "Focusing" is the procedure of adjusting the distance between the receive optics and the image sensor to cause the target T to be approximately in focus. The target may be any object or substrate and may bear a 1D or 2D bar code symbol or text or other machine readable indicia. A trigger 115 may be used for controlling full or partial operation of the reader 114.

Image sensor 154 may be a one or two-dimensional array of pixels adapted to operate in a rolling shutter, global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed.

The output of the image sensor may be processed utilizing one or more functions or algorithms to condition the signal appropriately for use in further processing downstream, including being digitized to provide a digitized image of target T. Digitizing or digitization may be representing an object, an image, or a signal (usually an analog signal) by a discrete set of its points or samples. The result is digital data called a "digital representation" or, more specifically, a "digital image", for the object, and "digital form", for the signal.

A microcontroller 160 may perform a number of processing functions and be located on board with other components, such as the image sensor. Microcontroller 160 may include a predetermined amount of memory 162 for storing firmware and data. The firmware may be a software program or set of instructions embedded in or programmed on the microcontroller which provides the necessary instructions for how the microcontroller operates and communicates with other hardware. The firmware may be stored in the flash memory (ROM) of the microcontroller as a binary or digital image data file and may be erased and rewritten. The firmware may be considered "semi-permanent" since it remains the same unless it is updated. This firmware update or load may be handled by a device driver.

The components in reader 114 may be connected by one or more bus 168, data lines or other signal or data communication form. Exemplary forms may be an Inter-IC bus such as a two wire interface (TWI), dedicated data bus, RS232 interface, USB, etc.

A host processor 118 or a local processor 170 may be utilized to perform a number of functional operation, which may involve the performance of a number of related steps, the particulars of which may be determined by or based upon certain configuration settings stored in memory 166 which may be any one of a number of memory types such as RAM, ROM, EEPROM, etc. In addition some memory functions may be stored in memory 162 provided as part of the microcontroller 160.

An exemplary function of a processor 118, 170 may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies. Decoding is a term used to describe the interpretation of a machine readable code contained in an image projected on the image sensor 154. The code has data or information encoded therein.

Imaging reader assembly 112 may also have an aiming generator light source 132, aiming aperture 133, aiming optics 136, an illumination source(s) 146 and illumination optics 148.

Illumination and aiming light sources with different colors may be employed. For example, in one such embodiment the indicia reader may include white and red LEDs, red and green LEDs, white, red, and green LEDs, or some other combination chosen in response to, for example, the color of the symbols most commonly imaged by the indicia reader. Different colored LEDs may be each alternatively pulsed at a level in accordance with an overall power budget.

Aiming pattern generator 130 may include a power supply 131, light source 132, aperture 133 and optics 136 to create an aiming light pattern projected on or near the target which spans a portion of the receive optical system 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like. Generally, the aiming light source may comprise any light source which is sufficiently small or concise and bright to provide a desired illumination pattern at the target.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis. Alternately, the aimer pattern generator may be a laser pattern generator.

The light sources 132 may also be comprised of one or more laser diodes combined with laser collimation lens (not shown in these drawings) to focus the laser light to a spot generally forward of the scanning hear and approximately at the plane of the target T. This beam may then be imaged through a diffractive interference pattern generating element, such as a holographic element fabricated with a desired pattern.

Indicia reader may include an illumination assembly 142 for illuminating target area T. Illumination assembly 142 may also include one or more power supplies 144, illumination sources 146 and illumination optics 148.

A communications module 180 provides a communication link from imaging reader 114 to other imaging readers or to other systems such as a server/remote processor 124.

The processor, memory and associated circuitry which performs or controls the exemplary image capture and decoding functions may be provided in the mobile device or on associated circuit boards which are located within the housing 117 of the mobile device 112.

In an exemplary embodiment the illumination source may be a laser for reflecting laser light off the target. This may be referred to laser scanning wherein the reflected laser light is converted into signals reflected off an IBI into IBI signals representative of the converted light. An aiming pattern generator may not be necessary in such an embodiment if the illumination laser provides an aiming function in addition to an illumination function.

Exemplary functions of a processor or processors 118, 170 may be to facilitate operation of the image capture function, decoding functions, and operator interface functions. Operating software may be utilized to operate the processor for such functions seemingly simultaneously or in a multitasking role.

A battery 218 may be used to provide power to the components of the mobile device.

The inclusion of imagers and/or discrete multi mega pixel cameras in mobile devices provides the ability to collect, store and transmit optical images. In an exemplary mobile device, an operator is provided the ability to directly annotate (226) images, particularly images that have artifacts, distortions, nondecodable information bearing indicia, abnormalities or other forms of information that need description which would otherwise be difficult to provide verbal descriptions of those noteworthy items displayed in an image and coordinate mating of the image with a descriptor file which describes the noteworthy items while the image data is resident in the display buffer. The image may be analyzed by the operator or a programmed processor for defects or abnormalities prior to annotation.

Transmitting the image data may mean moving or copying image data from a display buffer utilizing a data bus or other medium. The image data my be carried or transported by the data bus to other local or remote memory for utilization by a local or remote processor. Wired or wireless communication systems may be utilized for such transmission.

An exemplary part of a transaction may require an operator to provide a signature or other identifier to be electronically recorded as part of the transaction. Other times the operator may be required to input, display and record information in an image through some type of real keypad or virtual keypad provided on a display.

An exemplary display 116 employed in a mobile device may include a glass substrate that is separated from a deformable polyester cover by relatively small non-conductive spheres. The opposing surfaces of the substrate and the cover sheet are coated with a conductive material. The coated surfaces are, in turn, connected to lead lines that surround the display. The lead lines are connected to an x-y register that is arranged to record or store the input information in a display buffer 210. The forward the data to a microprocessor. The operator performs annotation on the pad using a plastic stylus 228 or a similar instrument having a point which is capable of forcing the conductive surface on the cover sheet at the contact point against the conductive coating upon the substrate thus electronically recording the annotation.

The touch screen or pad may be a transparent device for generating a position signal indicative of position of a touching of a top reference surface of the screen. The touch screen may have a protective overlay. Touch screens typically operate in association with a touch screen controller 222. Data entry on the screen may be made by a finger, stylus, or other device. Display 116 is responsive to the position signal from the touch screen to provide a visual simulation of the touching of the screen and may be driven by an appropriate controller.

An exemplary touch screen comprises a touch sensitive overlay element capable of providing a signal representative of the position of a stylus or other device placed in contact therewith. Broadly speaking, during operation of the touch screen, the stylus acts as a probe causing the top and bottom conductive layers of the touch screen to contact each other at the point of contact. The differing potentials between sides of the element, in two coordinate directions, are measured, converted into a digital signal to enable a trace of the movement of the stylus to be captured and retained for example, in the display buffer.

Positioned beneath the touch screen and having a display visible therethrough is a display module (such as a LCD module) which is capable of displaying information in response to electrical signals applied thereto. Electrical signals from the touch screen relating to movement of the stylus on the element can then be applied to the display module to provide a representation of input information, such as annotations, edits, signatures, etc. on the display. Thus, since the display module is positioned beneath the transparent touch screen, the movements of the stylus on the transparent surface are graphically captured in a display buffer 210 and visible at the points of contact of the stylus with the surface.

In an exemplary embodiment touch screen X, Y position coordinates are automatically sensed or determined. Such coordinates may indicate where a annotation starts, when the annotation is started where the annotation ends, when the annotation ends, etc.

An exemplary embodiment is a mobile device which enables an operator to annotate a captured image using an integrated touch panel and stylus (which may be native to the mobile device). The annotation may eliminate the need for the operator to communicate verbal or other extraneous annotation describing the area of interest in the image in ways other than through the image. The annotation may be controlled programmatically while minimally increasing overall image bit size or processing requirements.

In an exemplary embodiment, a user views a captured image and may manipulate the image to a desired field of view and clarity. The user may then draw, mark-up, annotate, sign, etc. the image, including highlighting areas of interest. Annotating areas of interest may include annotating damage in a picture of a damaged parcel, circling a signature block on a document image, noting closure of a security chock on an image of a customs chock, highlighting specific products in an image of a retail store shelf, etc. Once the operator has annotated the image, the updated image can be stored for future retrieval, or sent to a central repository for further analysis or verification.

Figure 5:
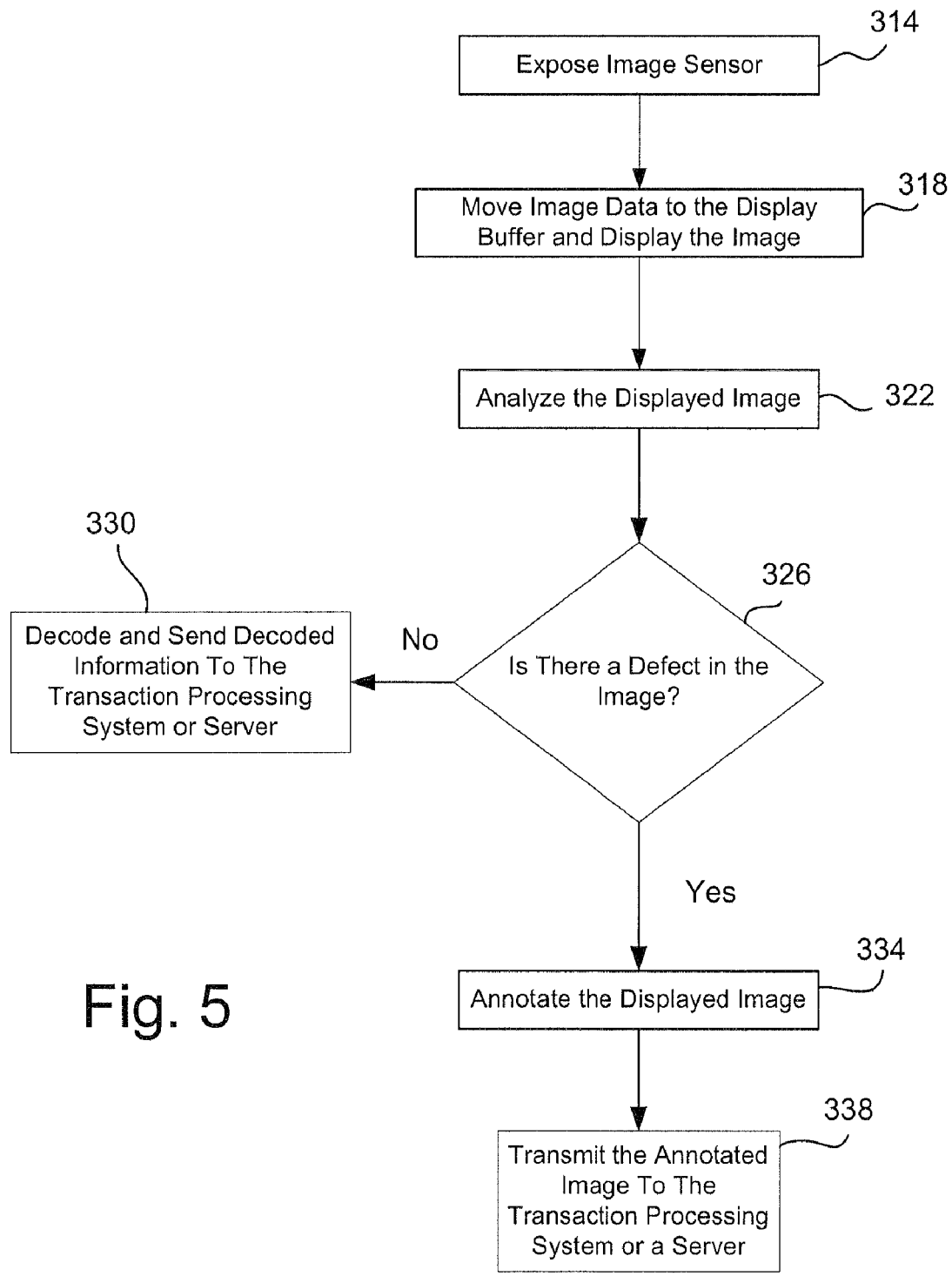
FIG. 5 is an exemplary flowchart for operating a mobile device.

FIG. 5 is an exemplary method of processing such instances wherein an image sensor disposed on a mobile device is exposed in a step 314. The image data is moved to a mobile device display buffer in a step 318 and displayed to an operator. The operator views and analyzes the displayed image in a step 322. A query is made in a step 326 whether there is a defect is present in the image. If no defect is detected the image file is decoded and the decoded information is transmitted for further processing in a step 330. If a defect is detected in a query 326 the operator annotates the defective image in a step 334. The annotated image is transmitted for further processing in a step 338.

Figure 6:
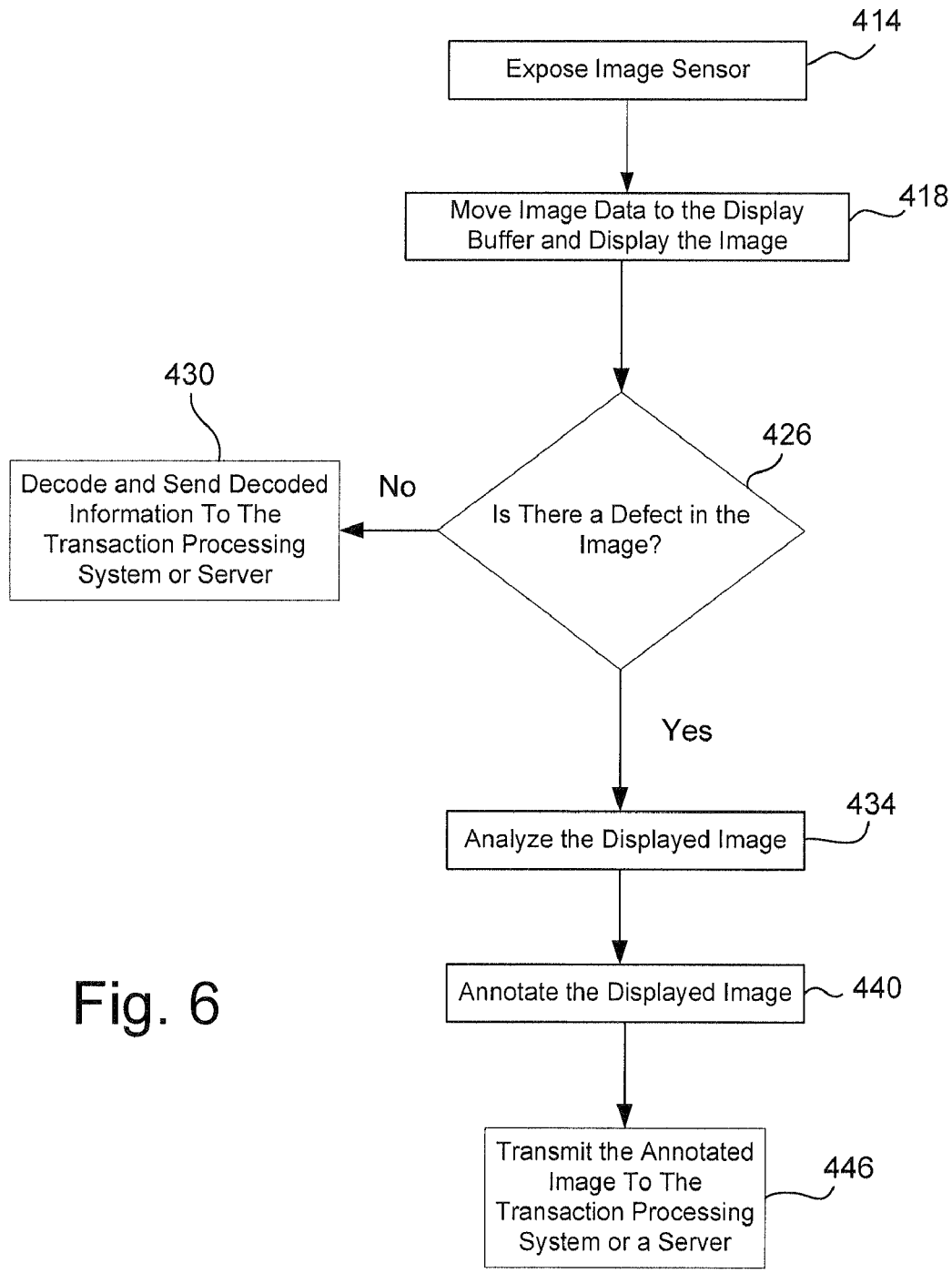
FIG. 6 is an exemplary flowchart for operating a mobile device.

FIG. 6 is an exemplary method of processing such instances wherein an image sensor disposed on a mobile device is exposed in a step 414. The image data is moved to the mobile device display buffer in a step 418 and displayed to an operator. A query is made in a step 426 whether there is a defect is present in the image. If no defect is detected the image file is decoded and the decoded information is transmitted for further processing in a step 430. If a defect is detected the operator or a programmed processor analyzes the displayed image in a step 434. The operator annotates the defective image in a step 440. The annotated image is transmitted for further processing in a step 446.

Figure 7:
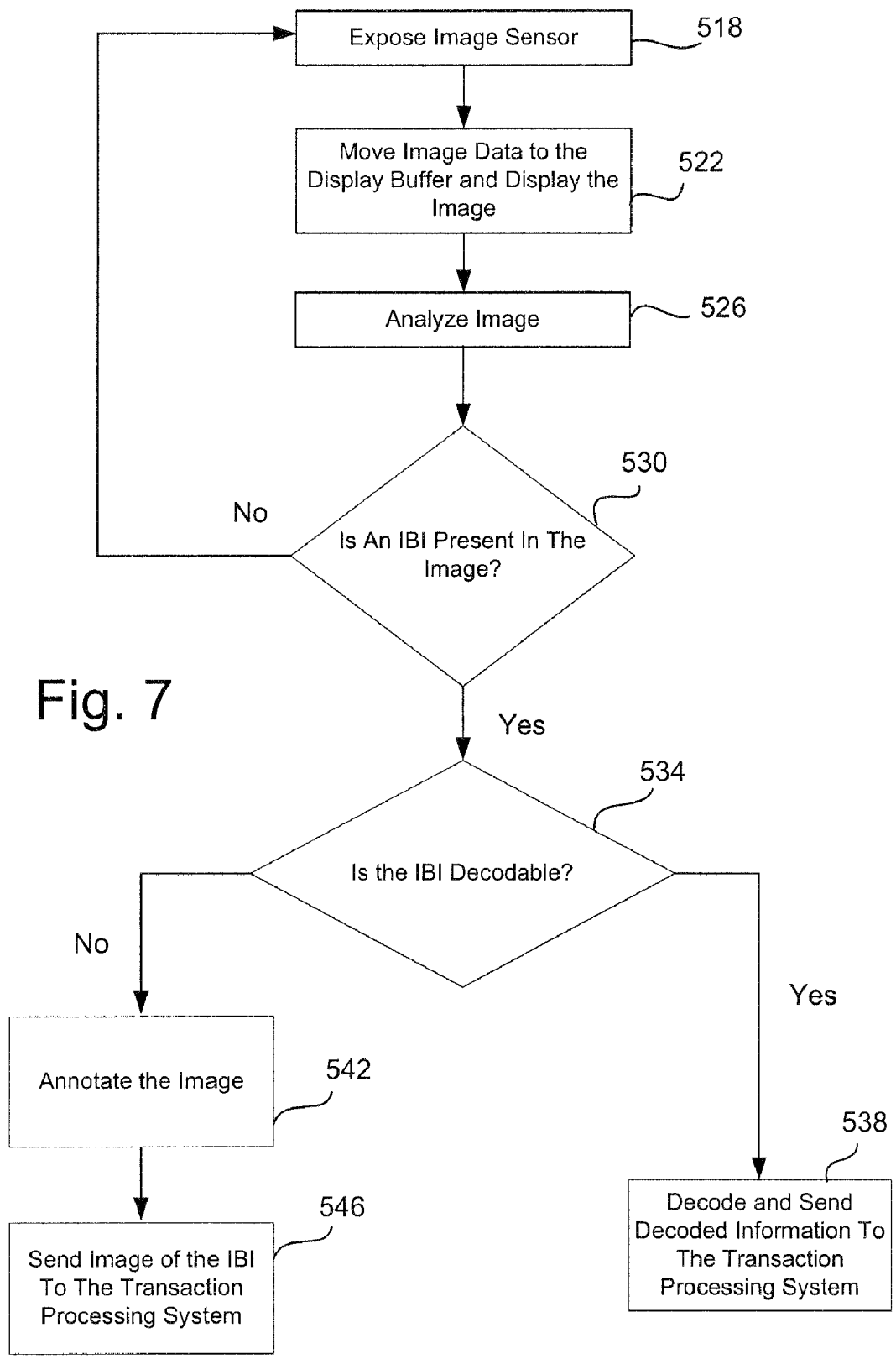
FIG. 7 is an exemplary flowchart for operating a mobile device.

FIG. 7 is an exemplary method of processing such instances wherein an image sensor disposed on a mobile device is exposed in a step 514. The image data is moved to the mobile device display buffer in a step 522 and displayed to an operator. The operator or a programmed processor analyzes the displayed image in a step 526. A query is made in a step 530 whether there is an information bearing indicia present in the image. If no, another exposure is taken in step 518. If an IBI is detected in the image a query is made if the IBI is decodable in a step 534. If yes, the IBI is decoded and the decoded information is transmitted to a transaction processing system or a host device or system in a step 526 to be utilized by the establishment. If the IBI cannot be or is not decoded, the image is annotated by the operator in a step 542 while the image data is in the display buffer. The annotated image is transmitted to the transaction processing system or a host device or system in a step 546 to be utilized by the establishment. The establishment may use this image for may purposes, such as information tracking or processing, using the image as evidence for quality or refund feedback information to the supplier of the IBI, tracking operators that have unsatisfactorily high nondecode scanning attempts, analyzing image reader problems, etc.

In an exemplary system, the system displays the annotated image on a host device or an annotated image and decoded IBI information are transmitted together to a host device. The annotated image may be stored in a host device for further processing, or sent to a third party supplier for evaluation, refund, etc. The image annotation may occur only after a predetermined number of failed decode attempts. The display and annotation of the image may only occur when an IBI cannot be or is not decoded.

An exemplary method of operating an image reader comprises the steps of: converting light reflected from a target into image data utilizing an image sensor; storing the image data in a display buffer; displaying the image on a display; annotating the displayed image by the operator while the image data is stored in the display buffer, thereby altering the image data in the display buffer; and, transmitting the altered image data from the display buffer; wherein the image sensor, display and display buffer are disposed in a common housing for hand held operation.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The described embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. A method of operating an image reader comprising the steps of:
   converting light reflected from a target into an image data utilizing an image sensor;
   storing the image data in a touch panel buffer;
   attempting to decode an information bearing indicia (IBI) present in the image data;
   displaying the image data on the touch panel if the IBI cannot be decoded;
   annotating the displayed image data by the operator using the touch panel while the image data is stored in the touch panel buffer, thereby altering the image data in the touch panel buffer; and,
   transmitting the altered image data from the touch panel buffer;
   wherein the image sensor, touch panel and touch panel buffer are disposed in a common housing for hand held operation.

2. A method of operating an image data reader in accordance with claim 1, further comprising the step of analyzing the image data for defects after the displaying step.

3. A method of operating an image reader in accordance with claim 1, further comprising the step of displaying the image data with a host device.

4. A method of operating an image reader in accordance with claim 1, further comprising the step of attempting to decode information bearing indicia (IBI) present in the image data and wherein the image data is displayed if the IBI cannot be decoded and the transmitting step comprises transmitting the annotated image data and decoded IBI information to a host device.

5. A method of operating an image reader in accordance with claim 1, wherein the annotation is performed with a stylus, real keypad or virtual keypad.

6. A method of operating an image reader in accordance with claim 1, further comprising the step of analyzing the image data utilizing a programmed processor.

7. A method of operating an image reader comprising the steps of:
   converting light reflected from a target into an image data utilizing an image sensor;
   storing the image data in a touch panel buffer;
   attempting to decode information bearing indicia (IBI) present in the image data;
   displaying the image data on the touch panel;

annotating the displayed image data by the operator using the touch panel while the image data is stored in the touch panel buffer, thereby altering the image data in the touch panel buffer; and, transmitting the altered image data from the touch panel buffer;

wherein the image sensor, touch panel and touch panel buffer are disposed in a common housing for hand held operation.

8. A method of operating an image reader in accordance with claim 6, further comprising the step of analyzing the image data for defects after the displaying step.

9. A method of operating an image reader in accordance with claim 7, further comprising the step of displaying the image data with a host device.

10. A method of operating an image reader in accordance with claim 7, wherein the transmitting step comprises transmitting the annotated image data and decoded IBI information to a host device.

11. A method of operating an image reader in accordance with claim 7, wherein the annotation is performed with a stylus, real keypad or virtual keypad.

12. An image reader comprising:

an image sensor for converting light reflected from a target into an image data;

a touch panel buffer for storing the image data;

a touch panel for displaying the image data;

annotating the displayed image data by the operator using the touch panel while the image data is stored in the touch panel buffer, thereby altering the image data in the touch panel buffer; and, a transmission system for transmitting the altered image data from the touch panel buffer;

a housing for housing the image sensor, touch panel and touch panel buffer for hand held operation.

13. An image reader in accordance with claim 1, further comprising a processor for analyzing the image data for defects.

14. An image reader in accordance with claim 1, further comprising a processor for attempting to decode information bearing indicia present in the image data.

15. An image reader in accordance with claim 1, a processor for attempting to decode information bearing indicia (IBI) present in the image data and displaying the image data if the IBI cannot be decoded.

16. A method of operating an image data reader in accordance with claim 1, wherein the user views an image and manipulates the image to a desired field of view and clarity.

17. A method of operating an image data reader in accordance with claim 1, wherein the user annotates a defect in an image.

18. A method of operating an image data reader in accordance with claim 1, wherein the image annotation is performed only after a predetermined number of failed decode attempts.

* * * * *